United States Patent [19]

Beckman et al.

[11] Patent Number: 4,467,499
[45] Date of Patent: Aug. 28, 1984

[54] STUFFING METHOD AND APPARATUS

[75] Inventors: John H. Beckman, Downers Grove; George C. Haettinger, Lagrange; Vytautas Kupcikevicius, Chicago, all of Ill.

[73] Assignee: Union Carbide Corporation, Danbury, Conn.

[21] Appl. No.: 261,313

[22] Filed: May 1, 1981

[51] Int. Cl.³ .............................................. A22C 11/00
[52] U.S. Cl. ........................................ 17/49; 17/1 R; 17/34
[58] Field of Search ............... 17/33, 34, 41, 42, 1 R, 17/49; 53/576

[56] References Cited

U.S. PATENT DOCUMENTS

| Re. 30,390 | 9/1980 | Kupcikevicius et al. | 17/49 |
|---|---|---|---|
| 1,302,194 | 4/1919 | Mayer | 17/41 X |
| 2,001,461 | 5/1935 | Hewitt | 17/45 |
| 2,428,202 | 9/1947 | Dyrek et al. | 17/39 |
| 3,457,588 | 7/1969 | Myles et al. | 17/33 X |
| 3,553,768 | 1/1971 | Wilmsen | 17/33 X |
| 3,748,690 | 7/1973 | Niedecker | 17/33 |
| 3,872,543 | 3/1975 | Niedecker | 17/33 |
| 4,007,761 | 2/1977 | Beckman | 138/103 |
| 4,202,075 | 5/1980 | Michel et al. | 17/41 |
| 4,306,334 | 12/1981 | Niedecker | 17/42 X |

FOREIGN PATENT DOCUMENTS

| 677517 | 1/1964 | Canada | 99/87 |
|---|---|---|---|
| 1148905 | 10/1983 | Fed. Rep. of Germany | 17/41 |
| 918250 | 2/1963 | United Kingdom . | |
| 1167377 | 10/1969 | United Kingdom . | |

Primary Examiner—Willie G. Abercrombie
Attorney, Agent, or Firm—Roger Aceto

[57] ABSTRACT

A method and apparatus for stuffing food product into shirred casing having an important application in the stuffing of large muscle groups such as whole boned hams. A demountable stuffing horn carries its own supply of shirred casing compressed in place at a high packing efficiency. Means are provided for readily and efficiently dismounting a horn from the stuffing machine when its casing supply is expended and mounting a replacement with a new supply in its place. Internal holdback means on the horn, manipulated through the casing by an external control device on the machine, provide a wide range of casing holdback force.

28 Claims, 13 Drawing Figures

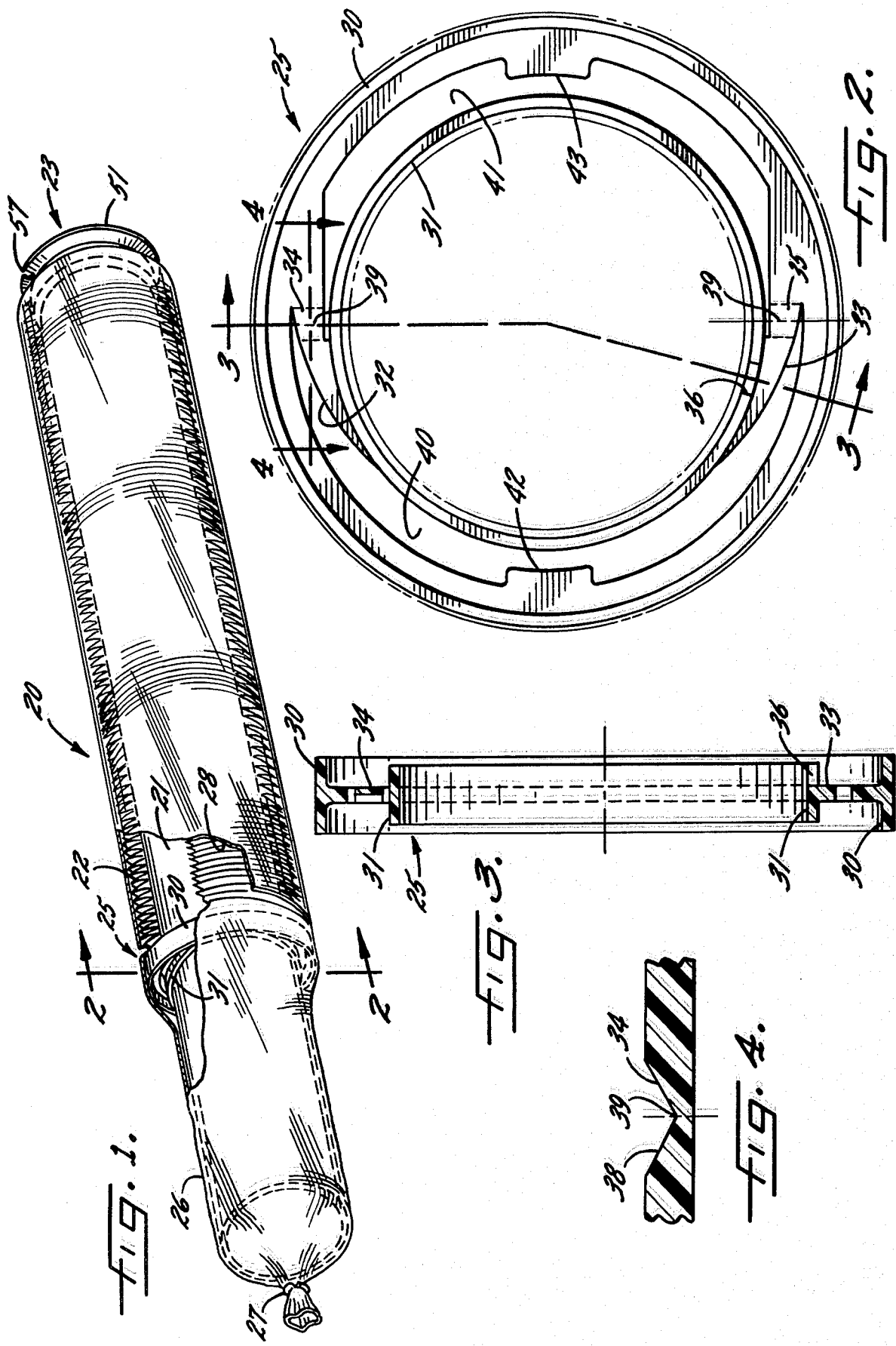

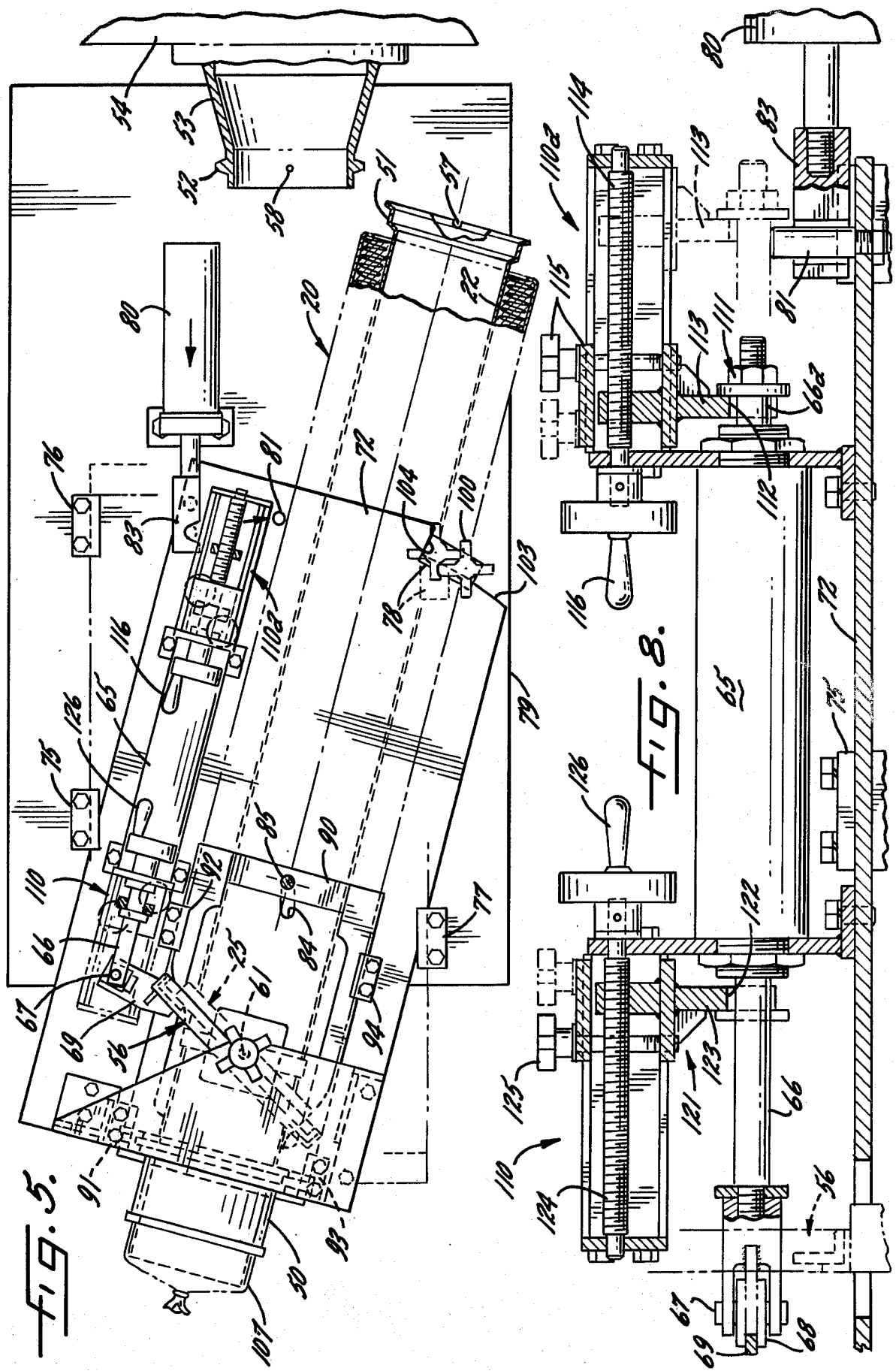

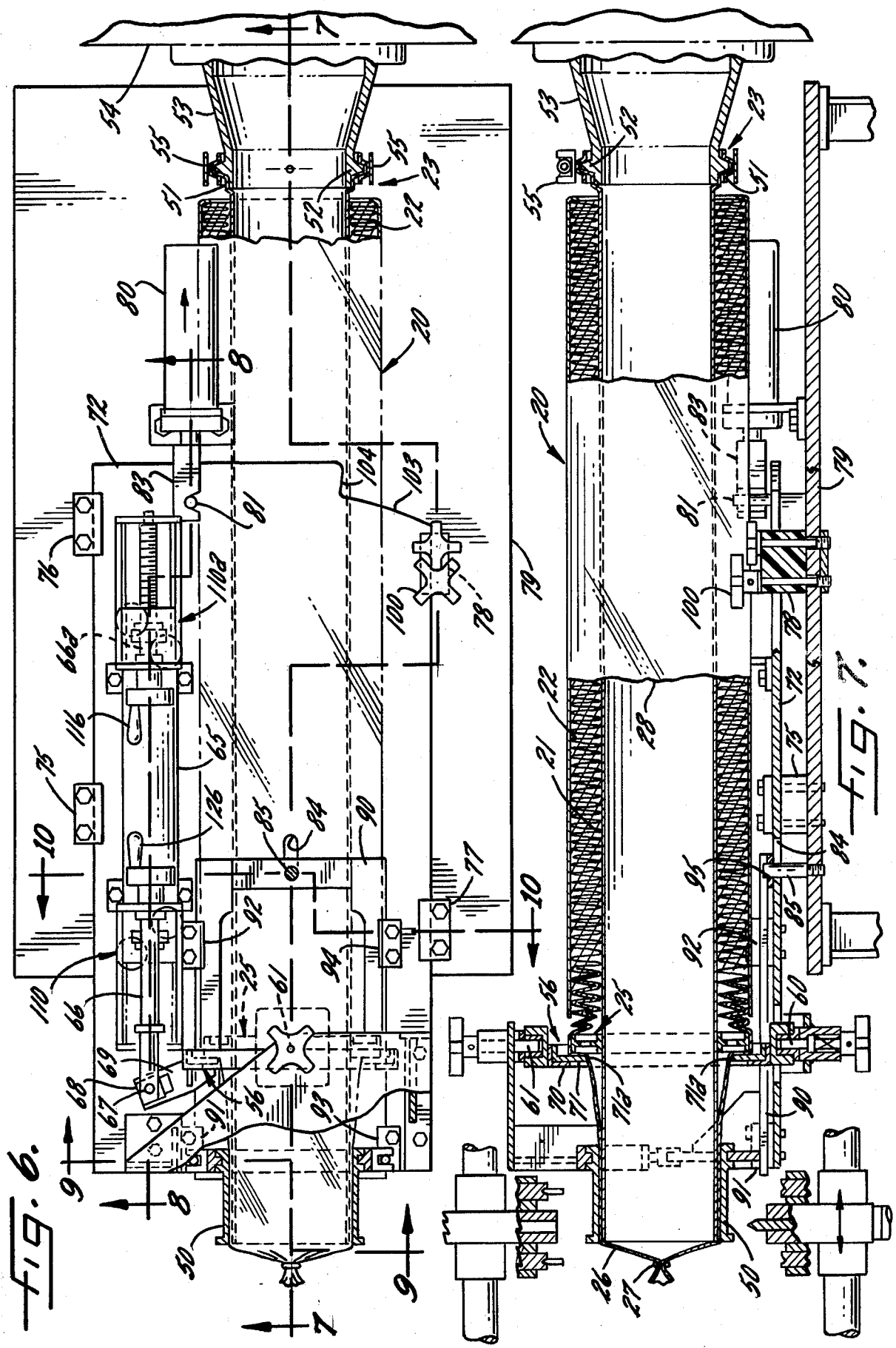

STUFFING METHOD AND APPARATUS

This invention relates to the stuffing of food product into shirred casing and has particular, although not exclusive, applicability to the stuffing of large muscle groups.

Boned hams are the principal commercial example in this country of large muscle groups for stuffing. The manufacture and shirring of large diameter casings for boned hams is much the same as for large diameter sausages, but the stuffing requirements differ. For one thing in ham stuffing, proper orientation of the meat mass is required so that the meat fibers of the grouped muscles or muscle portions are aligned in a desired direction and the fat cover, if any, remains properly oriented. It is advantageous to have the fibers normal to the slicing plane of the stuffed product, a consideration not involved in the stuffing of sausages with emulsion.

One method and apparatus for stuffing whole boneless hams into fibrous casing derived from a continuous shirred casing supply was disclosed in U.S. application Ser. No. 142,907, filed Apr. 23, 1980 by Haettinger et al., now abandoned and assigned to the same assignee as the present application. As disclosed therein, an operator arranges large muscle groups in a meat-loading chamber following which the chamber door is closed and locked, and the product in the chamber is compressed to assume a cylindrical shape. A two-stage piston first forces the muscle group to be encased out of the chamber into a stuffing horn and next forces the muscle group through the stuffing horn into the pre-clipped end of the shirred casing supply. A second tie clip is then applied to close the casing.

In the type of apparatus disclosed in the aforementioned application, the shirred casing stick is slid over a tension or support sleeve which itself is reciprocatable on a stuffing horn. This system for mounting a shirred casing on a stuffing horn is also shown in greater detail in Kupcikevicius et al. U.S. Pat. No. Re. 30,390. It does, however, require a compromise between casing stick inner diameter and stuffing horn bore, which in some cases was found to be unacceptable in stuffing boned hams. On the one hand, the size of the casing stick bore is limited by the desire to compact a long casing length into a limited shirred stick length. On the other hand, the bore of the stuffing horn which bears the sleeve carrying the casing stick must not itself be so small as to overcompress the hams. In many cases, muscle groups which had been properly arranged by the operator in the chamber became disoriented in the process of filling the casing, resulting in an inferior stuffed product. It is believed that the disorientation during stuffing is due in large part to excessive compression and tearing of the muscle groups as they enter the horn bore, complicated by the reaction of the muscle groups in leaving the horn as they expand into the casing, twisting and turning in an uncontrollable fashion.

It is one thing to appreciate that an increased stuffing horn bore would be generally desirable and another to accomplish that objective. Two considerations merit particular attention in ham stuffing.

First of all, the reciprocatable tension sleeve serves a very useful purpose in ham stuffing in creating slack in the casing at the beginning or at the end of a stuffing cycle. Slack at the beginning of the cycle permits ham movement to begin to deshir the casing without creating pressure so high as to blow the clip off the closed casing end. Slack at the end of a stuffing cycle permits the gathering gates of the clipper to gather and close the second casing end without creating excess pressure in the stuffed product which might otherwise cause the casing to break or the clip to blow off of the first casing end. Elimination of the sleeve and the clearance between its inner circumference and the stuffing horn would obviously make it possible to increase the stuffing horn diameter relative to the casing stick inner diameter, but the sleeve has been considered as too useful to permit that elimination.

A second problem is the clearance required between the casing stick and the tension sleeve. Using the casing stick generally described in Beckman U.S. Pat. No. 4,007,761, a reasonable amount of clearance must be provided in order to allow an operator to reliably slide the stick onto the tension sleeve without damage. This problem is further complicated by the nature of the shirring operation.

It is appreciated by those skilled in the shirring art that the size of the casing is important in establishing a relationship between the inner bore and the outer circumference of the shirred stick. Selection of the casing size is under the control of the packing house operator and thus not a function easily controllable by the casing manufacturer. As a result, it is a relatively common practice to accommodate stuffing machines to a few horn sizes, each capable of serving a group of casing sizes. The horn dimensions are selected as a compromise capable of accommodating a predetermined amount of casing shirred into a predetermined axial length having a bore capable of fitting onto the stuffing horn.

In the shirring operation, the casing is first compacted by shirring rolls or their equivalent on a mandrel whose diameter is related to the diameter of the associated stuffing horn. As a second phase of the shirring operation, an axial compressive force is applied to the shirred casing, further increasing the pack ratio. The shirred stick is then removed from the mandrel. Upon removal, as the compressive forces relax, the inner bore of the stick tends to "grow" inwardly, that is, to expand into part of the volume previously occupied by the mandrel, resulting in a decrease of the bore size. The range of the decrease is somewhat predictable, but it is generally necessary in commercial manufacture to allow for worst case expansion and leave an additional safety factor in order to assure that in all cases the shirred stick will fit on its associated stuffing horn. Furthermore, since in growing, the inner diameter of the stick occupies more volume than when it was compressed on the mandrel, there is a loss of some packing efficiency.

Because the casing size relates the inner and outer stick diameters, and because the shirred stick must always fit the stuffing horn even with worst case stick growth, the result is an adverse impact on the ability to maximize the bore of the stuffing horn, resulting in the deficiencies noted at the outset.

In view of the foregoing, it is a general aim of the present invention to increase the potential stuffing horn bore for a given casing size without adverse impact on the amount of casing which can be shirred into a stick of a given length.

A related object is to provide means for stuffing large muscle groups which markedly decreases the muscle disorientation introduced by the stuffing operation.

It is an additional object to provide an improved casing slack generator capable of controlling stuffing pressures over a wide range.

Finally, according to one aspect of the invention, it is an object to provide a casing article which allows stuffing of large muscle groups with minimum muscle disorientation, and a quick mount arrangement to facilitate loading the article on the stuffing machine.

Other objects and advantages will become apparent from the following detailed description when taken in conjunction with the drawings, in which:

FIG. 1 is a perspective view showing a preferred shirred casing article according to one aspect of the present invention;

FIG. 2 is an elevational view showing the internal restraining means taken along the line 2—2 of FIG. 1;

FIG. 3 is a sectional view taken along the line 3—3 of FIG. 2;

FIG. 4 is a partial sectional view taken along the line 4—4 of FIG. 2;

FIG. 5 is a plan view showing the stuffing machine with casing article inserted in the load position;

FIG. 6 is a plan view showing the stuffing machine with casing article in place and ready for stuffing;

FIG. 7 is an elevational view of the stuffing horn assembly taken along the line 7—7 of FIG. 6;

FIG. 8 is a partial elevation showing the operator selector for restraint adjustment taken along the line 8—8 of FIG. 6;

Figure 9:
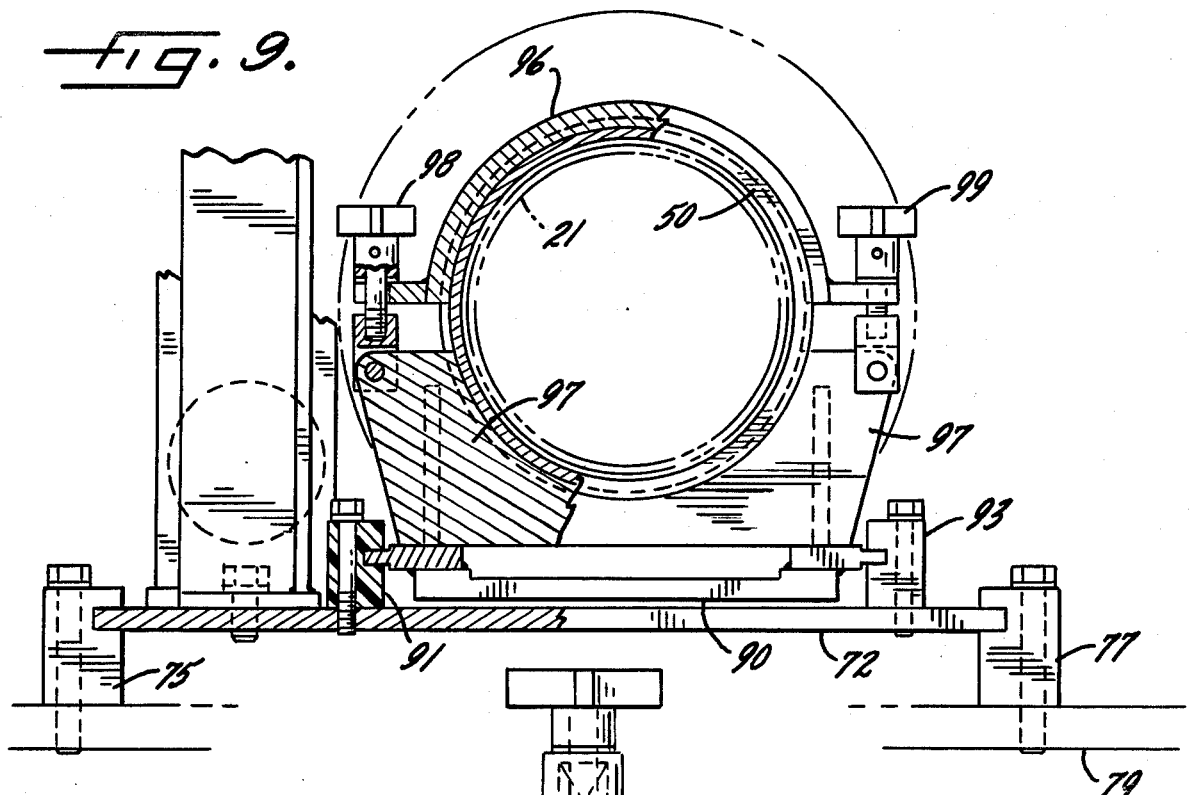
FIG. 9 is a partial sectional view showing the forward stick support taken along the line 9—9 of FIG. 6.

While the invention will be described in connection with certain preferred embodiments, there is no intent to limit it to those embodiments. On the contrary, the intent is to cover all alternatives, modifications and equivalents included within the spirit and scope of the invention as defined by the appended claims.

Turning now to the drawings, FIG. 1 shows a casing article 20 representing a preferred embodiment of one aspect of the present invention. In the embodiment of FIG. 1, a tube 21 serves not only as a base support for a casing supply 22, but also includes mounting means 23 for attachment to a stuffing machine stub (not shown) such that the tube 21 serves as the actual stuffing horn.

In the preferred embodiment, the casing supply 22 is compressed in place on the tube 21 so as to increase the amount of casing which can be fit into a casing article of given length by increasing the packing efficiency as described and claimed in Mahoney et al. U.S. application Ser. No. 261,304, filed concurrently herewith and assigned to the same assignee as this invention. Preferably the casing supply is premoisturized fibrous casing having a moisture content sufficiently high to permit stuffing without the addition of moisture by soaking. In instances where an oxygen barrier is required, however, a barrier film coated fibrous casing or a plastic film tube can be used.

While it is possible to compress the casing 22 in an off-line apparatus as described, for example, in Hewitt U.S. Pat. No. 2,001,461, it is preferred to compress the casing on the tube as a part of the shirring operation. In one approach, the casing can be shirred directly onto the tube, then compressed in place in the compression phase of the shirring operation. Alternatively, and particularly in the case of floating mandrel machines, a tube can be inserted on the compression stage of the mandrel, the casing shirred onto the mandrel in the shirring stage, then transferred to the tube at the compression stage following which compression takes place. In either case, the mandrel should support the inside of the tube so as to prevent its deformation during compression. With both procedures, the end result is a casing length compacted in place on the tube 21, with packing efficiency increased due to the support provided by the tube and the ability of the tube to eliminate the inward stick growth associated with unsupported shirred compacted casing sticks. For further details on high density shirring on supporting cores, the reader is referred to the aforementioned Mahoney application, the relevant disclosure of which is incorporated herein by reference.

In the preferred embodiment, the tube 21 is intended to be disposable after the casing supply is exhausted and thus should be as inexpensive as possible. The tube does, however, require sufficient strength to withstand the radial compressive forces exerted by the compacted casing, and whatever expansive forces might be generated by forcing muscle groups through its bore. As a result, it is preferred to make the tube of comparatively inexpensive synthetic materials such as plastics having sufficient strength to serve the intended purpose. A suitable example is a tube of high density polyethylene having a length of about three feet, a wall thickness of about 1/16th inch and a smooth untapered bore, and having a flange or other means at the inlet end for attachment to a stub of a stuffing machine.

In order to controllably restrain the casing during stuffing, internal holdback means 25 are associated with the tube to contact the inside of the casing. As illustrated in FIG. 1, an unshirred portion of the casing 26 has been pulled over the internal holdback means 25 and closed such as by means of clip 27. In this condition, the casing article can be placed on the stuffing machine, the mounting means 23 mated with and affixed to the stub of the stuffing machine, and product forced through the tube 21 which serves not only to support the casing, but also to carry the actual product being stuffed into the casing.

For purposes of saving the casing on a partly used stick, means are provided for protecting the remaining casing supply 22, shown herein as an elastic overwrap 28 covering the casing. If the casing supply is only partly used on a given day, the casing article 20 must be removed from the machine and the tube 21 must be sanitized before storage. The overwrap 28 is adapted to be pulled over the edges of the remaining casing supply (the clipped end of which can be severed and pulled back to the body of the shirred stick) following which the inside and outside of the tube 21 can be washed while the casing supply 22 itself is protected from being wetted or contaminated.

By way of appreciating the significant advantages attendant to the structure described thus far, a comparison is offered between capabilities using the approach described in the aforementioned Haettinger patent application, and that taught here. A typical casing for use in stuffing whole muscle hams is size 11 fibrous casing, which has a nominal flat width of about 8.3 inches and a recommended stuffed diameter of 6.08 inches. Based on years of experience in shirring casing, it is reasonable to expect in the practice compatible with the aforementioned patent application, approximately 200 feet of casing to be shirred into a two foot stick having an internal bore after inward stick growth which can reliably fit a supporting sleeve of 3.8 inch outer diameter. This example is given as being practical in a commercial sense, realizing that casing length per stick can be traded off against stick bore size, such that some increase in bore size can be achieved if the amount of casing per stick is reduced.

With the supporting sleeve outer diameter over which the stick must slide limited to 3.8 inches, when allowance is made for clearance between the tension sleeve and the stuffing horn, and for material thicknesses of the sleeve and horn, the resulting inner bore of the stuffing horn is only 3.6 inches. The system would be very capable of stuffing sectioned hams, but limited in its ability to stuff whole boneless hams. In addition the wall thickness of the horn and tension sleeve are severely limited, rendering those elements unacceptably fragile and susceptible to damage.

In practicing the present invention, a polyethylene disposable stuffing horn can be utilized for this application, having a wall thickness of 1/16 inch and an inner bore of 4.125 inches, a substantial increase over that provided with the previous system. The tube can be about three feet in length to allow for support of the discharge end and room to manipulate the internal restraining means. The fibrous casing supply compacted on about the base two feet of the horn, in contrast to the 200 foot length achieved with the prior approach, can be increased to 250 feet. The result is a substantial increase in stuffing horn bore which allows the stuffing of hams with proper muscle orientation which could not be handled reliably by the aforementioned system, achieved in tandem with a substantial increase in casing per stick.

As noted above, the ability to create slack casing is important at particular points in the stuffing cycle, and using the system described in the aforementioned Haettinger application, slack was created by fore and aft movement of the tension sleeve on the stuffing horn.

In accordance with the present invention, means are provided for substantially releasing the holdback force applied to the casing as a means of creating slack casing. Rather than actually carry the casing fore and aft, relying on movement of the casing stick with respect to the stuffed product or horn end to generate slack, the reduction in holdback force renders the casing more easily deshirrable, creating the effect of actual slack.

Figure 11:
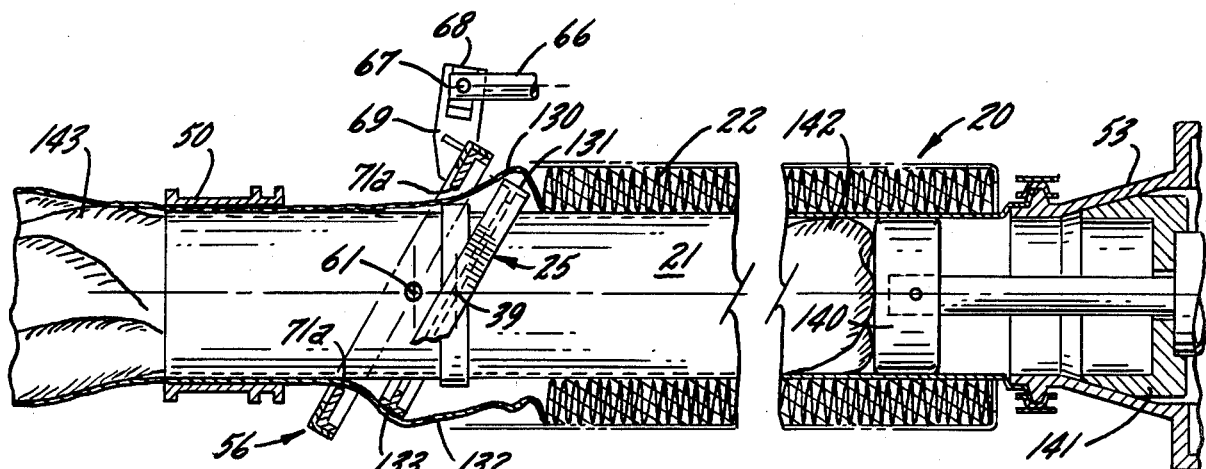
FIGS. 11-13 are partial schematic plan views showing various stuffing conditions.

Referring to FIG. 1 of the drawings for orientation, and FIGS. 2-4 for details of structure, the internal holdback means 25 is in the nature of a restraining ring having a rim portion 30 of circumference larger than the unstretched circumference of the casing, so that when the ring is in the upright position, it serves to stretch the casing and thereby generate a desired holdback force as the casing is passed over it. It is presently preferred to provide the ring with an outer diameter about equal to the recommended stuffed diameter of the associated casing. In further practicing the invention, means are provided for tilting the ring with respect to the longitudinal axis of the horn so as to reduce the amount of casing stretch, which in turn substantially decreases the holdback force. Referring briefly to FIG. 11, it is seen that the internal holdback ring 25 can assume a tilted position wherein holdback force is minimum (less than 10 pounds) and an upright position illustrated in FIG. 13 with substantially increased holdback force (on the order of 80 or 90 pounds).

To accomplish slack control in this manner, means are provided for pivoting the rim portion 30 of the ring 25 with respect to the longitudinal axis of the stuffing horn. In a preferred form of this aspect of the invention, such means are achieved by hinges formed in the injection molded ring assembly illustrated in detail in FIGS. 2–4. There is shown a holdback ring assembly 25 having the rim portion 30 connected to a horn mounting portion 31 by a pair of webs 32, 33 having hinges 34, 35 located at diametrically opposed points. The horn mount 31 is cylindrical in nature and of a size which mates the outside periphery of the tube 21. Accordingly, the tube 21 can be inserted within the cylindrical mount 31 and the ring then slid into proper orientation on the tube as shown in FIG. 1. An aligning notch 36 is provided for mating with a similar indicia on the tube 21 in order to properly orient the ring hinges 34, 35 radially with respect to the tube. Longitudinal orientation can also be achieved by matched indicia, although alignment by means of an assembly fixture is preferred. To preclude the possibility of relative movement, the position of the ring is fixed on the tube by means such as ultrasonic welding or riveting.

It is seen that the web members 32, 33 which join the external rim 30 to the internal mount 31 are relieved at the hinge areas 34, 35 (see FIG. 4 for detail) by a notch 38 to form a hinge line at 39 which allows the rim portion 30 to tilt with respect to the fixedly mounted portion 31. Substantial openings at 40 and 41 in the areas displaced from the hinge points allow sufficient clearance for substantial motion of the rim 30 with respect to the horn. A pair of tabs 42, 43 limit the maximum tilt angle such that the control apparatus described below can engage the rim when it is in the down position. Ring units as here described can be inexpensively manufactured of high density polyethylene by conventional injection molding techniques. To prevent warpage, opposed stacking notches, not shown, can be molded into opposite edges of the rim 30.

If it is desired to use the tilting ring apparatus for control of stuffing pressure on a permanent stuffing horn, such as a metal horn, the ring arrangement can be configured for greater permanency, for example, by using more substantial pivots in place of the hinges, and by using stronger material such as stainless steel or heavier gauge polyethylene. However, the apparatus illustrated in FIGS. 2–4 has been found to be very compatible with the disposable casing article shown in FIG. 1 in that it is relatively inexpensively manufactured, as is the tube itself. Furthermore, when such elements are used with the highly compacted casing supply taught in the aforementioned Mahoney et al. patent application, the increased supply of casing on the horn further enhances the benefits to be derived. Using the approach described in connection with FIGS. 1-4, the casing article is made sufficiently inexpensive to be disposable, but sufficiently attractive, including increased horn bore and increased casing supply, to be cost justifiable to the packer.

Before proceeding to a description of the manner in which a new casing article with fresh casing supply is loaded onto the stuffing machine, it will be useful to examine the stuffing machine elements which are associated with the casing stick in its operative position. Referring primarily to FIGS. 6 and 7, there is shown the casing article 20 of FIG. 1 having its discharge end inserted within and supported by cylindrical support means 50. In addition to providing a support function, the cylinder 50 is dimensioned to encircle the horn end sufficiently closely to serve as a product backflow seal. The mounting means 23 associated with the inlet end of the casing article is shown as a flange 51 which mates an abutment 52 on the stub 53 of a stuffing machine (a fragment of which shown at 54). The horn 21 is firmly attached to the stub by a quick release band clamp 55 and is thus in position to receive product to be stuffed and discharge the product through its plastic bore into the closed end of the shirred casing supply.

For controlling stuffing pressure, means are provided for setting the angle of tilting ring 25, shown herein as tilting ring controller 56. Referring briefly to the partial sectional plan views of FIGS. 11–13, it is seen that the tilting ring controller 56 is translatable with respect to the tilting ring 25 from a distant position illustrated in FIG. 11 to a proximate position illustrated in FIG. 12, and also has angle control means which can adjust the tilting ring 25 between what will be termed a relaxed position shown in FIG. 12 and an upright position shown in FIG. 13.

Figure 10:
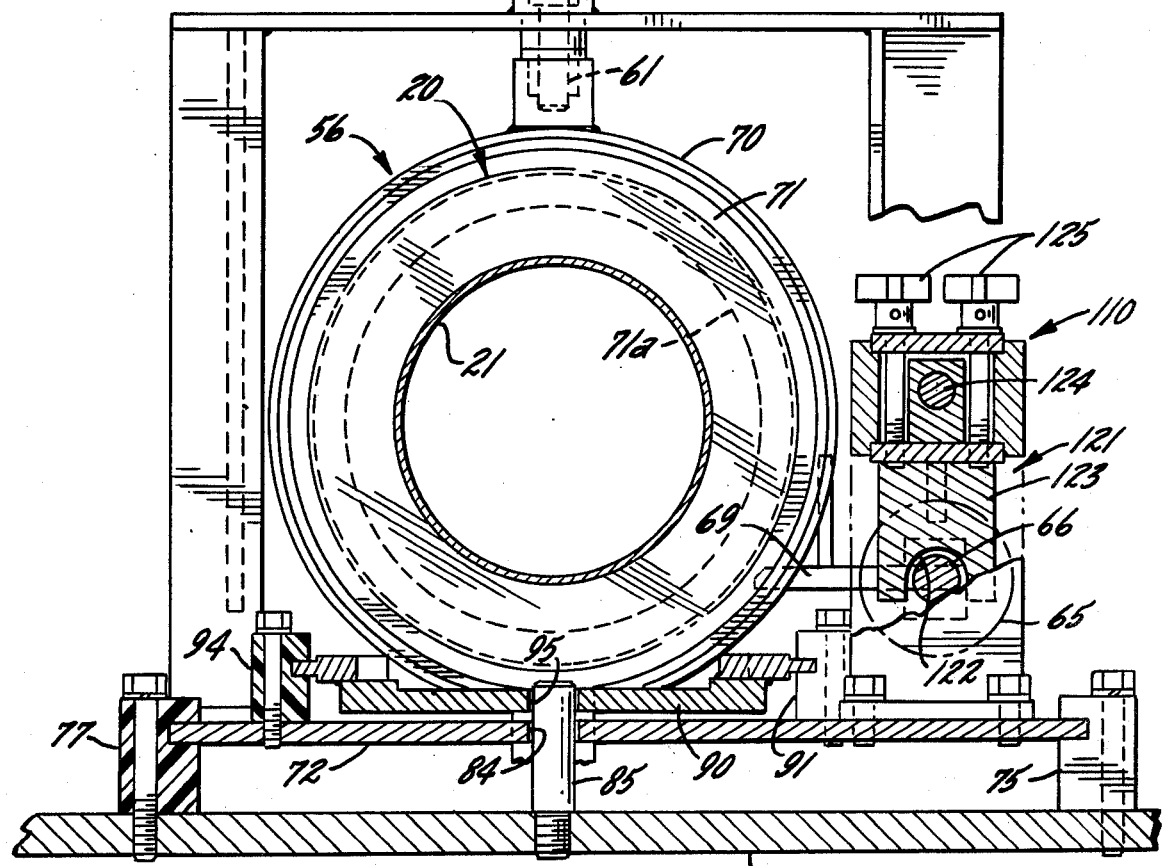
FIG. 10 is a partial sectional view showing the internal restraint controller taken along the line 10—10 of FIG. 6.

As best shown in FIGS. 7 and 10, the tilting ring controller 56 is pivotably mounted by a pair of vertically aligned pivots 60, 61 to create a vertical axis for tilting. The pivots are of the quick release variety to allow ease of disassembly for maintenance or cleaning. The vertical pivot axis requires the tilting ring hinges to also be vertically aligned when the stuffing horn is in its operative position. As an aid in aligning the tilting ring hinge line with the vertical pivot axis, the flange 51 is notched at 57 to mate a pin 58 (FIG. 5) on the stuffing horn flange.

Referring to FIG. 6, means are provided for controlling the angle of the tilting ring controller 56 with respect to the axis of the inserted stuffing tube 21 so as to control the angular position of the internal tilting ring 25. To that end a pneumatic cylinder 65 is provided having an operating rod 66 pivotably attached at 67 to a block 68 slidable in a slot in an operating arm 69. The operating arm 69 in turn is affixed as by welding to a metal annular member 70 which carries a control ring 71. The control ring 71 or at least its bearing surface 71a is preferably of plastic such as polyethylene because it is in direct contact with the casing, and serves to confine the casing rather closely when it is in its position proximate the tilting ring 25.

Figure 12:
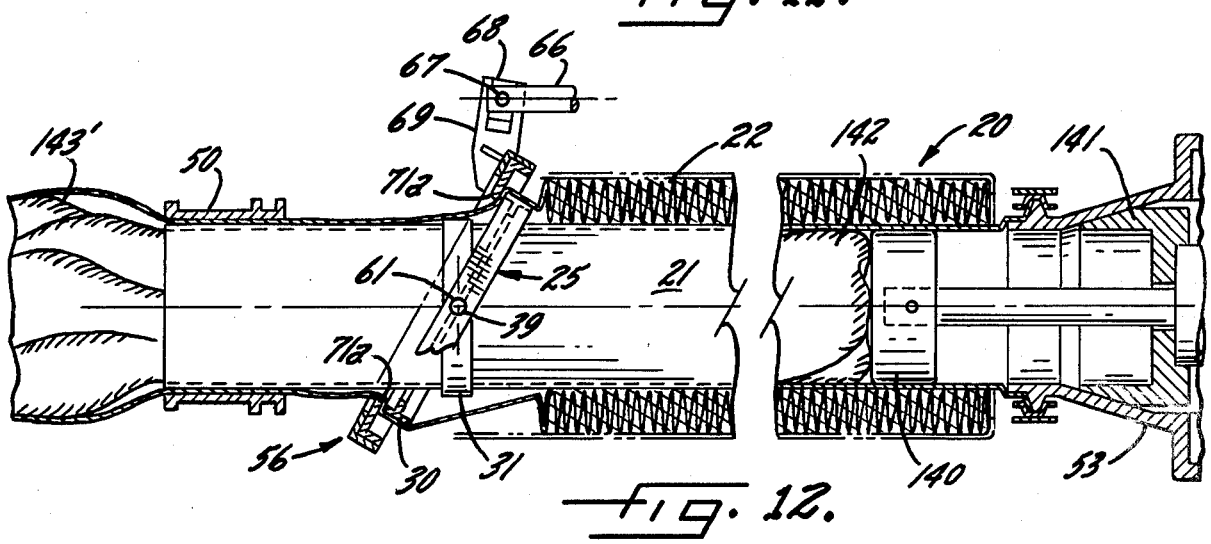

In the showing of FIG. 6, the tilting ring controller 56 is in its upright position, with the cylinder rod 66 extended. When it is desired to bring the tilting ring controller to an inclined position, the pneumatic cylinder 65 is actuated to withdraw the cylinder rod which serves to pull the control arm 69 to the right in FIG. 6, achieving positions such as illustrated in FIGS. 11 and 12. There is sufficient freedom in the block and slide arrangement 68 to accommodate the radial component of inward motion of the control arm 69.

In order to further increase the range of stuffing pressure control, in addition to the tilting function of the controller, means are provided for translating the tilting ring controller 56 with respect to the tilting ring 25 along the axis of the stuffing horn. To that end, the tilting ring control elements described thus far are mounted on a base plate 72 (see FIGS. 6, 7 and 10) which is mounted for translation in four ways 75–78 which in turn are attached to the frame 79 of the stuffing machine. The base plate 72 is, therefore, capable of sliding between the position illustrated in FIGS. 6 and 7, in which the bearing surface 71a of the tilting ring controller is proximate the tilting ring, and separated therefrom only by the thickness of the casing, and a second position which is approximately one inch advanced (to the left) of that illustrated in which the tilting ring controller is separated from the tilting ring. The means for causing such relative motion are shown herein as a pneumatic cylinder 80 which engages a pin 81 fixed to the base plate 72. When the cylinder rod is advanced, the entire base plate with attached tilting ring controller is moved approximately one inch to the left, separating the tilting ring and tilting ring controller. For purposes of limiting the amount of travel of the base plate 72, the plate is slotted at 84, and the slot aligned with a pin 85 affixed to the machine frame.

In many applications it is useful to translate the tilting ring controller at a predetermined point in the stuffing cycle. When that is done, because of the sealing engagement between the horn end and the cylindrical support 50, it is necessary to avoid relative motion between those elements. Accordingly, the cylindrical support 50 is mounted so as to remain stationary with respect to the stuffing machine (and therefor the stuffing horn) while the base plate 72 is free to translate. More particularly, a plate 90 serves as a base for the support 50, and is slidably mounted on the base plate 72 by means of four ways 91–94. The plate 90 is configured to engage the pin 85 which establishes the limits for translation of base plate 72. However, rather than being slotted as is base plate 72, the plate 90 has a circular opening 95 which fits over the pin 85, but holds the plate 90 in fixed position with respect to the pin (and therefore the machine and horn), while the base plate 72 translates between its limits. Accordingly, the tilting ring controller 56 can be translated with respect to the tilting disc 25 without disturbing the alignment between the stuffing horn end and the backflow seal 50.

FIGS. 9 and 10 are useful in illustrating the manner in which the plates 72, 90 are mounted in their respective ways. Additional detail of the tilting ring controller 56 and cylindrical support 50 are also given, most of the details of which will be apparent to those skilled in the art upon inspection of the drawings. For example, FIG. 10 shows the quick release coupling 61 which is readily disconnected to remove the tilting ring control assembly 56, for cleaning, or for exchanging it for a controller of a different size. FIG. 9 shows that the cylindrical support 50 is held in place by a yoke arrangement including an upper member 96 attached to a lower member 97 by quick release couplings 98, 99. As a result, the cylinder 50 which is preferably a polyethylene insert can be readily removed for cleaning, as well as for exchange with a unit of a different size for use with a horn having a different outer diameter.

While the discharge end horn support 50 is useful in supporting the extended end of a plastic tube and providing a product backflow seal, and while the external tilting ring controller 56 is useful in controlling the position of internal tilting ring 25, at first glance the relative positions of those elements would seem to significantly complicate the manner in which the casing stick can be loaded. In practicing the invention, however, a quick mount arrangement is provided which allows the casing stick to be associated with the operative machine elements and clamped in place by an operator without significant exertion or time consumption. In accomplishing quick loading, the entire base plate 72 which carries the tilting mechanism, and which is itself reciprocated for controlling translation, is made readily pivotable to accept a casing stick from the rear, and to allow sufficient stick displacement so that the stick can be swung into place and engaged with the stuffing horn stub 53. Turning to FIG. 5, there is shown the stuffing machine apparatus in the load position, with a casing article 20 inserted within the cylindrical support 50 and through the tilting ring controller 56. In order to achieve the load position shown in FIG. 5 after the casing supply on a dismountable horn is expended, it is typical to begin from the "rest" position in which the translation cylinder 80 is advanced and the tilt cylinder 65 causes the tilting ring controller 56 to assume the relaxed position. To remove the tubular core 21 of the expended casing article with the apparatus in that condition, the operator first disengages the clamp 55 to disconnect the stuffing horn base from the stub 53, then slides the stick forward so that the base 51 is freed of the stub 52. The operator then releases a single way clamp 100 which, as shown in FIG. 5, allows the way to pivot from its normal position shown in FIG. 6 to the released position shown in FIG. 5. The pin 85 engaged in slot 84 of plate 72 and in aperture 95 of plate 90 serves as a pivot point for the entire mounting assembly. The ways 75, 77 are positioned with respect to the pivot point 85 such that the entire plate can pivot while remaining supported by these two ways. The rear end of the plate 72 is relieved at 103 to allow pivoting until a stop 104 is reached as shown in FIG. 5.

While the description of that operation requires a number of sentences, the actual operation is quite direct in that all the operator need do is release the clamp 100 and pull the rear of the assembly toward him which immediately causes the apparatus to assume the load position shown in FIG. 5. The clevis 83 on the operating rod of the pneumatic cylinder 80 is used to engage the pin 81 in such a way that the plate assembly is disconnected from the cylinder without any manual manipulation of those elements. Since the cylindrical support subplate 90 is mounted entirely on the base plate 72 and also pivoted about pin 85, the elements through which the new casing stick 20 must be inserted, pivot together to the FIG. 5 position in which the entire assembly has swung sufficiently away from the body of the stuffing machine to allow a stick to be readily inserted. The relaxed position of the tilting ring controller 56 is an additional aid in aligning the casing article because the article can be supplied with the tilting ring 25 in the relaxed condition (as shown in FIG. 1) which makes the approximate position of the horn visually obvious. The stick is initially inserted through the tilting ring controller 56 and cylindrical support 50 beyond its normal position, a portion 107 being shown extended, creating sufficient clearance between the flange 51 of the tube 21 and the abutment 52 of the stub horn 53 to allow the plate assembly with article to be pivoted back to the operating position. The operator need only lock the way clamp 100, pull the casing stick rearward to engage its flange 51 with the abutment of the stub horn, then replace the quick release clamp 55. The slot 57 and pin 58 assure precise positioning in which the pivot axis of controller 56 is aligned with the tilting ring hinge axis. Stuffing can then commence immediately.

Before turning to the use of the apparatus for particular stuffing applications, attention will first be directed to the relative positions which the tilting ring controller 56 can assume. First of all, the translation cylinder 80 has two positions, namely proximate in which the tilting ring controller is in contact with the tilting ring 25 through the casing, and distant in which the elements are separated by a given distance such as one inch. The limits for establishing those positions in the illustrated embodiment are set by the dimensions of the slot 84 which engages the pin 85. Operator adjustable limits could be provided for setting different distant or proximate positions, but present indications are that such an adjustment is not required.

The tilting cylinder 65 provides two angular positions termed relaxed and upright. It is currently believed that the ability to adjust the particular angles for those positions would be useful. To that end, stroke adjustment means generally indicated at 110, 110a are associated with the tilting pneumatic cylinder 65. As best illustrated in FIG. 8, the cylinder 65 is of the double-ended variety having a pair of operating rods 66, 66a attached internally to a single piston. The rod 66a is engaged by an adjustable stop generally indicated at 111. It is seen that the rod 66a projects through an aperture 112 in a movable stop member 113 whose position is adjustable by its engagement with a stationary lead screw 114. A clamp 115 is provided to lock the stop 113 in a selected position.

In the position illustrated in solid lines in FIG. 8, the cylinder 65 is set for maximum advance, which allows sufficient travel of the rod 66 to bring the tilting ring controller 56 into the full upright position which is approximately at an angle of 90° with respect to the axis of the stuffing horn 21. Release of the clamp mechanism 115 and operation of the lead screw 114 by means of the hand wheel 116 serves to move the stop 113 to the right, toward the position illustrated in phantom. Doing that serves to set a limit for the advance stroke of the cylinder 65, preventing the ring controller 56 from reaching the 90° position. In that case, the upright position is less than 90°, with the magnitude of the decrease being controlled by the position of the adjustable stop 113.

Similarly, an adjustment is provided for setting the tilt angle for the relaxed position. As illustrated in FIG. 8, the adjustment means 121 establishes a relaxed position wherein the tilting ring controller 56 is at an angle with respect to the stuffing horn axis of about 60°. Release of the clamp mechanism 125 allows advance of the stop 122 to the left, which limits the return stroke of cylinder 65, causing the relaxed angle (with respect to the stuffing horn axis) to be greater than 60° by a controllable amount.

In operation, the controls 110, 110a are adjusted to suit a particular stuffing application, the relaxed position control 121 being set to achieve the required casing holdback force during casing gathering and closing, and the upright position control 111 being set to achieve the required casing holdback force during stuffing. Since the stuffing pressures required in any given packing house application can be different, routine experimentation in each house may be necessary to establish the desired angles.

Because of the diversity of operating procedures at various packing houses, it is difficult to predict all of the operating conditions to which the apparatus of this invention might be subjected. However, in order to convey some idea of the versatility of the device, and to give some appreciation of the advantages attendant to the present invention, typical operating conditions will be described with reference to FIGS. 11-13. As noted above, the tilting ring controller 56 has at least two angular positions, termed relaxed and upright, and at least two translation positions termed distant and proximate. Those positions provide three combinations which are worthy of note. FIG. 11 illustrates the maximum casing slack condition (minimum holdback) where the tilting ring angular position is relaxed and the tilting ring transverse position is distant. The relaxed position of the tilting ring typically provides no stretching of the casing, and therefore minimum internal holdback, achieved primarily by ironing out the shirred pleats and by frictional engagement of the casing with the internal ring 25 and external controller 56. It should be noted that when the casing portion 130 is passing over the ring portion 131, the diametrically opposed part of the casing 132 is free to contact the stuffing horn tube 21. A similar situation exists where the casing passes over the portion 133 of the ring 25.

The maximum slack condition of FIG. 11 is created not only by allowing the tilting ring 25 to fall to its relaxed position, but also by translating the tilting ring controller 56 to the distant position. Thus, not only is the casing stretch over the ring 25 eliminated, but the external holdback enhancement, created by the bearing surface 71a acting with the ring 25, is minimized by moving those elements apart. It has been found in a practical application that useful pull forces as low as 8 or 9 pounds can be created with the condition illustrated in FIG. 11.

The dual piston stuffing elements described in the aforementioned Haettinger application, are schematically illustrated at 140, 141 in FIG. 11. For additional detail, the reader is referred to that application and the disclosure of the dual piston stuffing apparatus is incorporated herein by reference. As shown in FIG. 11, the piston 141 is in maximum advanced position bearing against the tapered inside section of stub horn 53, and the piston 140 is forcing the ham product 142 through the stuffing horn and into the casing at 143. The size of the stuffed product 143 as compared to those shown in FIGS. 12 and 13 is minimized to illustrate in an exaggerated fashion that casing holdback force and therefore stuffing pressure is minimized by the condition there shown.

Turning now to FIG. 12, there is shown a medium casing slack condition (medium holdback force) where the ring 25 remains in the position illustrated in FIG. 11, but where the tilting ring controller 56 is translated to the proximate position, creating contact between the bearing surface 71a and the sizing ring 25 through the casing 22 which is sliding therebetween. When in the illustrated position, the pivot point of the tilting ring controller 56 is preferably coincident with the hinge line of the tilting ring so that the elements can pivot in unison without pinching the casing. In the medium slack condition shown in FIG. 12, casing holdback forces on the order of 20 to 40 pounds can be achieved, creating medium stuffing pressures illustrated in exaggerated form by the medium-sized product 143'.

Figure 13:
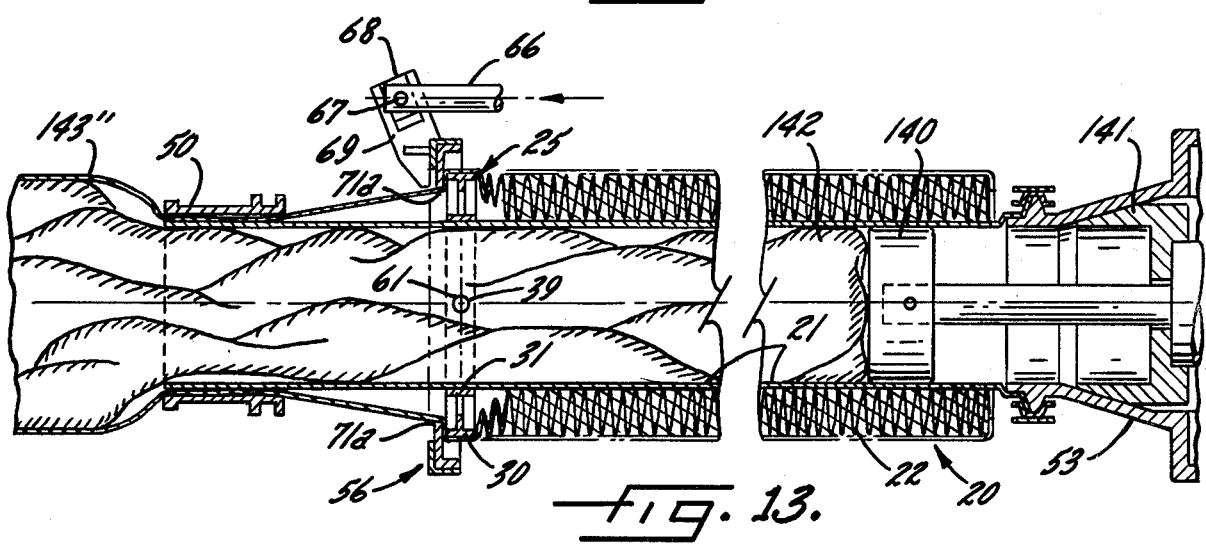

The minimum casing slack condition, useful for creating maximum stuffing pressures is illustrated in FIG. 13. The condition of FIG. 13 is best achieved by beginning in the medium slack condition of FIG. 12, then operating the tilt cylinder 65 (FIG. 6) to advance the tilting ring controller 56 from the relaxed to the upright position. The fact that the pivot points of the tilting ring controller and the hinge line 39 of the tilting ring 25 are coincident allows the tilting ring controller 56 to carry the tilting ring 25 upright without pinching the casing which is sliding therebetween. In the illustrated position, the tilting ring 25 provides maximum holdback force due to the maximum stretching of the casing, while holdback force is further supplemented by the contact between the bearing surface 71a and the tilting ring 25 through the casing. Holdback forces on the order of 70 to 90 pounds have been achieved with the condition illustrated in FIG. 13. The maximum stuffing pressure thus obtained is illustrated in exaggerated form by the comparatively larger size of the stuffed product 143".

It should be appreciated that there are numerous variations of the basic conditions illustrated in FIGS. 11–13, capable of creating other levels of stuffing pressure. More particularly, recalling the description of FIG. 8, the relaxed and upright positions of the tilting ring 25 are selectable by the operator, such that an upright position of less than 90° can be selected to reduce the maximum stuffing pressure, and relaxed positions of greater than 60° can be created to increase minimum and medium stuffing pressures.

In addition to the various static positions, the tilting ring stuffing pressure control is very suitable for significant changes in stuffing pressure during the course of each stuffing cycle. For example, to preclude the possibility of increasing product pressure and breaking the casing during the casing gathering operation, the following procedure might be useful. Stuffing is commenced in the maximum holdback condition illustrated in FIG. 13, and the tilting ring controller 56 is maintained in that position until all of the ham is forced from the stuffing tube into the casing. Prior to the gathering operation (which is accomplished by the clipper) the control ring 56 is translated from the FIG. 13 to the FIG. 11 position, which allows the tilting ring 25 to fall to its relaxed position. The tilting ring controller 56 may be tilted down at that point if desired to arrive at this rest position. Alternatively, it might be possible to accomplish the same result by advancing the mechanism from the FIG. 13 through the FIG. 12 to the FIG. 11 condition.

Another possible situation which might be encountered in a stuffing operation is one where relatively large muscle groups are stuffed, creating, even with the increased bore of this invention, the tendency for the hams to twist and turn as they leave the discharge end of the stuffing horn. In order to allow the muscles to return to a favorable orientation before being forced under pressure into the casing, it is desirable to begin stuffing with minimum casing holdback. Accordingly, stuffing is commenced in the condition illustrated in FIG. 11 and can proceed until 25% to 100% of the ham is stuffed into the casing. It is noted at this point that it is quite difficult to provide an equivalent amount of casing slack using the reciprocatable support sleeve of the aforementioned Haettinger application, and that furthermore creating slack by reciprocating a support sleeve requires cycle time in which stuffing is not being accomplished. By way of contrast using the tilting ring described herein, it is possible to create the effect of as much casing slack as desired (continuously variable), and the slack effect is created while stuffing is in progress.

In the meat packing application being described, after stuffing a significant portion of the product into the casing with minimum casing holdback, the tilting ring controller 56 is then advanced through the FIG. 12 to the FIG. 13 position which increases the casing holdback force which in turn increases the stuffing pressure to force all of the stuffed product firmly into the casing, producing a tight void-free stuffed product. The clipper then gathers the rear of the casing which further compresses the product, then a clip is applied to tie the product off. The pneumatic control circuitry for sequencing this operation, particularly for initiating the change from one tilting ring angle to another can incorporate a limit switch for sensing actual product length, or preferably a timer for initiating transfer a predetermined interval after cycle commencement.

The medium holdback force position (FIG. 12) is useful by way of example for creating flat hams. Such hams can be entirely stuffed and clipped with the holdback control elements in the FIG. 12 position. That creates a loosely packed product which is then flattened by use of conventional flattening screens, thereby tightening the product within the casing.

A further novel mode of operation not achievable with apparatus used heretofore is the ability to gradually increase stuffing pressure as the stuffing cycle commences. This is particularly useful in situations where attaining stuffing pressures of too great a magnitude too early in the cycle tends to blow the casing pre-tie clip off the end of the casing. In such situations, stuffing can commence at the minimum holdback force condition (FIG. 11) and, following initiation of the cycle, the tilting ring controller can be gradually advanced through the FIG. 12 to the FIG. 13 position. Such advance can be by way of pneumatic flow controls feeding either or both of the control cylinders 65 and 80. The low holdback force at the start of the cycle allows the meat mass to enter the casing at a low pressure and begin to deshirr the casing, following which the gradual increase in stuffing pressure tightens the product in the casing and attains the desired stuffed size. The cycle of the tilting ring controller from minimum to maximum holdback can be initiated by the signal which starts the advance of the second stage piston.

As pointed out in the aforementioned Haettinger application, in the case of stuffing muscle groups, air in the system can tend to be a problem unless provisions are made for accommodating it. For example, it was noted that the second stage piston corresponding to piston 140 of FIG. 11 should be perforated in order to preclude the possibility of drawing the casing end into the stuffing horn by creating a vacuum in the horn on the return stroke of the piston. When using a plastic stuffing horn 21 according to the present invention, it is also desirable to perforate the first stage piston 141 such that a vacuum is not created behind the second stage piston as it advances through the stuffing horn. Because the plastic stuffing tube is not completely rigid, if such a vacuum were created, the tube walls would tend to collapse.

The stuffing system described herein also requires the elimination of air forced by the piston into the casing in advance of the meat mass. Provisions were made for venting with the apparatus described in the aforementioned Haettinger application by allowing escape of air to the rear of the casing stick. That is not practical when using the compressed in place casing forming the preferred embodiment of the present invention. Accordingly, it is desirable to use prestuck casing preferably of the class referred to as "double prestuck", or, at any rate, a casing which allows sufficient venting through the prestuck holes to expel the excess air from the system and from the stuffed product. It is also worthy of note that the seal provided by cylindrical support 50, while being adequate to prevent backflow of the stuffed product or its juices, should allow venting of air so that the significant stick portion to the rear of the seal can receive, then expel air forced into the casing by advance of the piston. The double presticking helps to immediately vent some of the air directly from the product as it advances into the casing, and the substantial stuffing horn length from discharge end to tilting ring (approximately 8 inches) provides sufficient volume to hold the air as it vents through the prestuck holes.

The ability to substantially alter stuffing pressure during the stuffing cycle which is achieved by this invention, can be used to advantage in some circumstances as an aid in expelling unwanted air. In some cases the air which is forced into the closed casing in advance of the meat mass can actually deshirr a length of casing, ballooning it out on the order of 10 Iinches or so. To prevent that, the stuffing cycle can be initiated in the maximum holdback condition (FIG. 13), which holds the casing in place and tends to force the air through the liquid seal provided by cylindrical support 50 to enter the space between the tube 21 and deshirred casing portion 26, through which it is vented. After most of the air is forced from the stuffing horn, and before the meat mass begins to enter the casing, holdback force can be reduced to the FIGS. 11 or 12 condition so as to allow stuffing to commence at reduced pressure. The system can then be cycled to return to the maximum holdback condition (FIG. 13) prior to clipping, as described above, in order to tighten the product and achieve desired size.

The invention has been described in the commercially significant environment of stuffing whole muscle groups such as hams, because that environment makes full use of the benefits of the system, and also because the invention satisfies requirements not heretofore achievable. There are, however, other stuffing applications which can achieve at least some of the advantages of the invention. For example, the provision of a compacted in place casing on a thin walled plastic stuffing tube can benefit certain emulsion stuffing requirements by reducing the pressure drop across the stuffing tube. More particularly, even in stuffing emulsions, the increase in effective stuffing horn bore size (along with the increase in casing capacity) allows the emulsion to pass through the stuffing horn with lesser pressure drop than achievable with the conventional approach. As a result, there is less smearing of the stuffed product, which is especially valuable with relatively dry emulsions. Alternatively, if the pressure drop is not a significant problem, the stuffing tube can be further lengthened and/or decreased in diameter to accommodate an even greater casing supply.

It is also expected that the tilting ring means of stuffing pressure control can have applicability to stuffing of emulsion products even without the feature of using the plastic tube as a stuffing horn. More particularly, in stuffing machines which do not firmly apply the first tie clip, stuffing premoisturized casing with a fixed sizing ring can be difficult because high stuffing pressures are required to begin to deshir the casing, and these pressures may exceed the ability of the first tie clip to stay in place. Controlling stuffing pressure in that application by way of a tilting ring allows the start of the stuffing cycle with substantially reduced pressures, allowing the casing to begin to deshir before the ring is tilted up and stuffing pressure increased to normal. In this application, a permanent tilting ring can be removably secured to a permanent stuffing horn, a tubular support with tilting ring can be used as a disposable stuffing horn, or a tubular support with tilting ring can be slid over a permanent stuffing horn.

What is claimed is:

1. A shirred tubular casing article comprising in combination, a tubular support, means for mounting the tubular support on a stuffing machine, a compacted shirred casing supply on the tubular support and frictionally engaging the tubular support, and internal holdback means associated with the discharge end of the tubular support for exerting a holdback force on the casing during stuffing, wherein said internal holdback means is a tiltable ring pivotable about the tubular support, whereby pivoting of the ring varies the holdback force exerted on the casing to control stuffing pressure.

2. A shirred tubular casing article comprising in combination,
   (a) a tubular support having sufficient strength to serve as a stuffing horn, and means on said support for attachment to a stuffing machine as a stuffing horn;
   (b) a compacted shirred casing supply on said tubular support;
   (c) an adjustable internal holdback means on said tubular support and within said casing for providing a controllably variable holdback force on said casing as said casing is stuffed;
   (d) said holdback means including a ring having a rim bearing on the inside of said casing; and
   (e) mounting means pivotally connecting said ring to said tubular support to permit said ring to tilt with respect to the axis of said tubular support, thereby to vary the holdback force.

3. The combination as set out in claim 2 in which the stuffing horn has a bore of sufficient size to pass whole muscle groups, and in which the casing length is fibrous reinforced.

4. A shirred tubular casing article comprising in combination:
   (a) a tubular support having a discharge end;
   (b) means for mounting said tubular support on a stuffing machine;
   (c) a compacted shirred casing supply on said tubular support, said casing supply being in tight frictional engagement on said tubular support;
   (d) a tiltable ring associated with said discharge end for exerting an internal holdback force on said casing during the stuffing thereof, said ring having an outer rim for engaging said casing;
   (e) inner mounting means for engaging about said tubular support;
   (f) a web connecting said inner mounting means to said outer rim; and
   (g) hinge means incorporated in said web for pivoting said rim with respect to said mounting means and tubular support.

5. The combination as set out in claim 4 wherein the hinge incoporated in the web is positioned so as to pivot the rim about a hinge line passing through the axis of the tubular support.

6. A stuffing horn assembly for use with a shirred casing supply and for controlling casing holdback force in a stuffing operation, comprising a stuffing horn intended to receive a shirred casing supply, a tiltable ring associated with the discharge end of the stuffing horn and having a rim of a fixed circumference greater than the unstretched circumference of the casing intended to be loaded on the stuffing horn and over the ring, and pivot means for enabling tilting of the ring with respect to the stuffing horn axis to vary the casing holdback force exerted by the tiltable ring.

7. The stuffing horn assembly as set out in claim 6 further including mounting means for securing the tiltable ring to the stuffing horn, said pivot means connecting the rim to the mounting means for allowing tilting of the ring.

8. The stuffing horn assembly as set out in claim 7 wherein the pivot means comprises a pair of webs connecting the mounting means to the rim, and means incorporated in the webs for hinging the rim with respect to the mounting means.

9. A tiltable ring for exerting an internal controllable casing holdback force on a casing during a stuffing operation to control stuffing pressure, said ring comprising a fixed outer rim adapted for engagement with the casing to retard same, the rim having a circumference greater than the unstretched circumference of the casing, mounting means for associating the rihg with the discharge end of a stuffing horn, and pivot means connecting the rim to the mounting means to enable the ring to tilt about the stuffing horn axis thereby to vary the holdback force exerted on the casing.

10. The tiltable ring as set out in claim 9 wherein the pivot means has a pivot axis which intersects the axis of the stuffing horn.

11. A tiltable ring for insertion within a length of tubular casing for controlling casing holdback force, comprising a rim having a circumference greater than the unstretched circumference of the casing, mounting means for engaging a stuffing horn to mount the ring on the horn, web means connecting the rim with the mounting means, and hinge means incorporated in the web means for establishing a pivot axis for tilting the rim with respect to the horn so as to vary the casing holdback force.

12. The tiltable ring as set out in claim 11 wherein the hinge means comprises indentations of the web means at two diametrically opposed positions, thereby to form a pivot having an axis arranged to intersect the axis of the stuffing horn.

13. A quick mount arrangement for mounting a demountable stuffing horn on a stuffing machine wherein the demountable stuffing horn has its own supply of shirred casing and an adjustable internal holdback device, the quick mount arrangement comprising in combination, a forward support for engaging the demountable stuffing horn near the discharge end for support thereof, external control means for manipulating the adjustable internal holdback device through the casing, a base for supporting the forward support and control means, and pivot means for the base establishing a first position in which the bore of the demountable stuffing horn is aligned with the stuffing machine for stuffing, and a second position in which the demountable stuffing horn is free for demounting.

14. The combination as set out in claim 13 further including quick release means for attaching the demountable stuffing horn to the stuffing machine.

15. A stuffing apparatus for use with a demountable stuffing horn, wherein the demountable stuffing horn carries its own shirred casing supply and a tiltable ring having an outer circumference greater than the unstretched circumference of the casing, said stuffing apparatus comprising in combination, a base plate, forward support means on the base plate for engaging and supporting the discharge end of the demountable stuffing horn, external control means mounted on the base plate for controlling the angle of the tiltable ring, means for translating the base plate to create at least two positions where (a) the external control means is proximate the tiltable ring to increase holdback force and (b) the external control means is distant from the tiltable ring to decrease holdback force, and further control means for establishing at least two angular positions for the external control means thereby to establish at least two positions of the tiltable ring including (a) an upright position in which holdback force is maximum and (b) a relaxed position in which holdback force is reduced, and means pivoting the base plate between at least two positions including (a) a stuffing position in which the bore of the demountable stuffing horn is aligned with the discharge of the stuffing machine for stuffing and (b) a load position in which the demountable stuffing horn is accessible for demounting.

16. A stuffing apparatus for use with a stuffing horn, wherein the stuffing horn has a casing supply and a tiltable ring inside an unshirred portion of the casing supply, the tiltable ring having an outer circumference greater than the unstretched circumference of the casing and being tiltable with respect to the longitudinal axis of the stuffing horn to vary the holdback force exerted on the casing, said stuffing apparatus comprising in combination control means outside of the casing having a bearing surface for contacting against the outside of the casing to press against the tiltable ring through the casing, and means for varying the angle of the control means with respect to the longitudinal axis of the stuffing horn, thereby to vary the corresponding angle of the tiltable ring inside the casing.

17. The combination as set out in claim 16 further including means for translating the control means with respect to the tiltable ring between a distant position and a proximate position in which the control means is in contact with the tiltable ring through the casing.

18. The combination as set out in claim 16 in which the tiltable ring has a pivot axis intersecting the stuffing horn axis, the control means including means for tilting the bearing surface about said pivot axis, thereby to avoid pinching of the casing while tilting the tiltable ring.

19. A method of controlling stuffing pressure in a casing stuffing operation, comprising the steps of engaging the inside of the casing with an internal holdback means which is movably mounted for movement between at least two positions for producing casing holdback forces of two magnitudes, and controlling the position of the internal holdback means within the casing by manipulating the internal holdback means through the casing with an external controller acting against the outside of the casing as a means of controlling stuffing pressure.

20. A method of controlling stuffing pressure in a casing stuffing operation, comprising the steps of engaging the inside of the casing with a tiltable ring having a circumference greater than the unstretched circumference of the casing, and controllably tilting the ring within the casing with respect to the axis of the stuffing horn to vary the engagement of the ring against the inside of the casing and thereby controlling stuffing pressure.

21. A method of controlling stuffing pressure in a casing stuffing operation, comprising the steps of engaging the inside of the casing with a ring having a circumference greater than the unstretched circumference of the casing, and tilting the ring within the casing by contacting against the outside of the casing for manipulating the ring through the casing thereby altering the engagement of the ring against the inside of the casing for controlling stuffing pressure.

22. The method as set out in claim 21 further including the step of releasing the contact with the ring to allow the ring to assume a relaxed position and decrease the amount of holdback force exerted.

23. A method of stuffing large muscle groups into fibrous casing comprising the steps of providing a quick connect stuffing horn with a compacted shirred fibrous casing supply and an internal tiltable ring, mounting the quick connect stuffing horn on the stuffing machine with the bore of the horn positioned to receive large muscle groups from the stuffing machine, forcing large muscle groups through the bore of the horn into the casing, internally restraining the casing by engagement with the tiltable ring, controlling the angle of the internal tiltable ring to vary such engagement and thereby control stuffing pressure, and clipping the end of the casing closed to form an encased product.

24. A method of controlling stuffing pressure in a casing stuffing operation comprising the steps of controlling the angle of a ring within the casing with respect to the axis of a stuffing horn, beginning to stuff product into the casing with the ring in the tilted position to reduce holdback force thereby to allow the casing to begin to deshir as it is stuffed, and advancing the ring to a more upright position as stuffing progresses, thereby to increase stuffing pressure to more tightly pack the stuffed product into the casing.

25. The method as set out in claim 24 further including the step of tilting the ring to a less upright position after the product is stuffed into the casing but before gathering the casing for clipping.

26. A method of controlling stuffing pressure and expelling air in a casing stuffing operation comprising the steps of controlling the angle of a ring within the casing with respect to the axis of a stuffing horn, holding the ring upright at cycle start to prevent deshirring while air is expelled, tilting the ring to reduce holdback force to allow the casing to begin to deshir as it is stuffed, and advancing the ring to a more upright position to increase stuffing pressure to more tightly pack the stuffed product into the casing.

27. A method of producing a shirred casing article comprising the steps of providing a demountable stuffing horn, mounting a shirred casing supply on the stuffing horn, mounting a tiltable restraining ring on the stuffing horn associated with the discharge end thereof, longitudinally and radially orienting the tiltable restraining ring on the stuffing horn so as to be in position to mate with external control means on an associated stuffing machine when the casing article is installed for stuffing, pulling an unshirred end of the casing supply over the tiltable restraining ring, and closing the unshirred casing end.

28. The method as set out in claim 27 wherein the step of mounting the casing supply includes compacting the casing supply in place on the stuffing horn.

* * * * *